(No Model.)
C. W. HUNT.
CAR TRUCK.
No. 452,919.            Patented May 26, 1891.
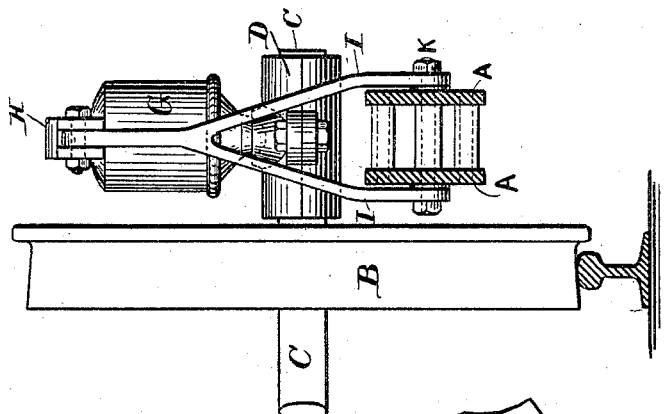
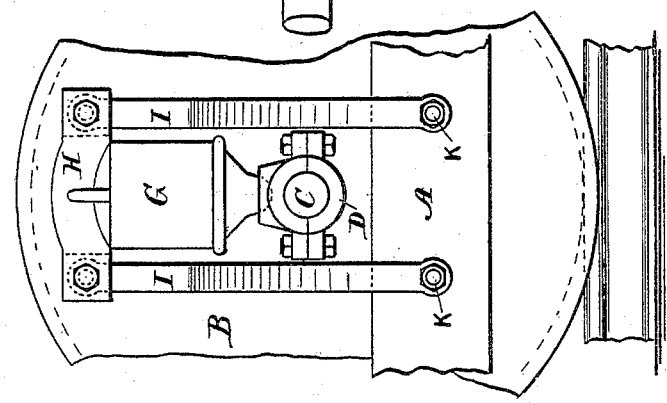
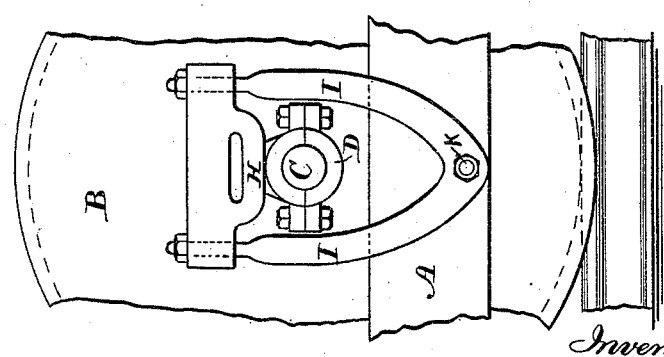
Witnesses
Chas H Smith
J. Stail
Inventor
Charles W. Hunt.
Per Lemuel W. Serrell
Atty

UNITED STATES PATENT OFFICE.

CHARLES W. HUNT, OF WEST NEW BRIGHTON, NEW YORK.

CAR-TRUCK.

SPECIFICATION forming part of Letters Patent No. 452,919, dated May 26, 1891.

Application filed February 2, 1891. Serial No. 379,914. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

In my patent, No. 347,936, granted August 24, 1886, the car-frame is suspended below the axle-boxes by links and cross-heads above the axle-boxes, and in some instances springs intervene between the axle-boxes and the cross-heads. In car-trucks thus constructed the car-frame is liable to swing laterally upon the car-wheels, and this sometimes arises while the load is being placed upon the car or from the inertia of the car when it strikes the curve. To obviate these difficulties I construct the suspending-links triangularly, or of an A shape, so that the two bearings at the lower ends of the links are distant from each other where connected to the frame, whereby lateral movement of the frame in relation to the wheels is prevented.

In the drawings, Figure 1 is an elevation endwise of the frame, representing the improved links; and Figs. 2 and 3 are side views of the suspending-links and axle-boxes.

The frame A, wheels B, and axle C are similar to those in my aforesaid patent, and the frame A may be between the wheels, as in aforesaid patent, or outside of the wheels, as shown in Fig. 1, and the axle-boxes D receive the axle, and springs G may be used above the axle-boxes, as in Figs. 1 and 2, or they may be dispensed with, as shown in Fig. 3, and the cross bearer or bar H extends over the axle-box and between the pairs of links I, and such links I are either separate and parallel, as shown in Fig. 2, or they are brought together at the connecting-bolt K upon the frame A, as seen in Fig. 3; but the links I, instead of being single, are made with double bearings at their lower ends, and each link can pass at the outer sides of the frame A, and the connecting bolts or pivots K pass through the lower ends of the links and into or through the frame A and connect such links with the frame, and these links can swing upon the pivots backwardly and forwardly upon the frame, as may become necessary in suspending the weight upon the axle-boxes and in allowing the axle to assume a radial position to a curved track or a right-angled position to a straight track, and in cases where the car or truck frame may lurch or receive a sudden sidewise movement the links I maintain the frame and wheels in their proper relative positions.

I claim as my invention—

The combination, with the car frame, axle, wheels, and boxes, of a cross-bearer H above each box, links connected at their upper ends to such cross-bearer and having double bearings at the lower ends, and pivotal attachments between the double bearings of the links and frame and on which the parts are free to swing, substantially as specified.

Signed by me this 26th day of January, 1891.

CHAS. W. HUNT.

Witnesses:
  GEO. T. PINCKNEY,
  HAROLD SERRELL